US010355352B2

(12) United States Patent
Wattwood et al.

(10) Patent No.: US 10,355,352 B2
(45) Date of Patent: Jul. 16, 2019

(54) ALIGNMENT SYSTEM FOR POINT-TO-POINT ALIGNMENT OF SPACED APART FIRST AND SECOND ANTENNAS AND RELATED METHODS

(71) Applicant: SUNSIGHT HOLDINGS, LLC, Maitland, FL (US)

(72) Inventors: James A. Wattwood, New Smyrna Beach, FL (US); Evan Beeton, Maitland, FL (US)

(73) Assignee: SUNSIGHT HOLDINGS, LLC, Maitland, FL (US)

( * ) Notice: Subject to any disclaimer, the term of this patent is extended or adjusted under 35 U.S.C. 154(b) by 317 days.

(21) Appl. No.: 15/227,316

(22) Filed: Aug. 3, 2016

(65) Prior Publication Data
US 2017/0141463 A1     May 18, 2017

Related U.S. Application Data

(60) Provisional application No. 62/214,408, filed on Sep. 4, 2015.

(51) Int. Cl.
*H01Q 3/00* (2006.01)
*H01Q 3/08* (2006.01)
(Continued)

(52) U.S. Cl.
CPC ............. *H01Q 3/08* (2013.01); *G01S 19/35* (2013.01); *H01Q 3/14* (2013.01); *G01S 19/14* (2013.01);
(Continued)

(58) Field of Classification Search
CPC .. H01Q 3/08; H01Q 3/14; H01Q 3/32; H01Q 3/34; H01Q 1/125; G01S 19/35; H04L 67/10; H04W 4/025
(Continued)

(56) References Cited

U.S. PATENT DOCUMENTS

| 7,501,993 | B2* | 3/2009 | Boucher | G01S 19/43 343/757 |
| 7,782,861 | B2 | 8/2010 | Reda et al. | |
| 8,193,983 | B1* | 6/2012 | Farmer | H01Q 3/06 342/367 |
| 8,451,171 | B1 | 5/2013 | Santoru | |
| 8,849,288 | B2* | 9/2014 | Vilhar | G01R 29/10 455/446 |
| 10,096,886 | B2* | 10/2018 | Xu | H01Q 1/1257 |

(Continued)

FOREIGN PATENT DOCUMENTS

| WO | 2008154514 | 12/2008 |
| WO | 2016003864 | 1/2016 |

OTHER PUBLICATIONS

Wattwood et al., U.S. Appl. No. 15/227,284, filed Aug. 3, 2016.

*Primary Examiner* — Chuong P Nguyen
(74) *Attorney, Agent, or Firm* — Allen, Dyer, Doppelt + Gilchrist, P.A. Attorneys at Law

(57) ABSTRACT

An alignment system for point-to-point alignment of spaced apart first and second antennas may include first and second end-point alignment kits. The first end-point alignment kit may include a first antenna alignment device for determining the actual position data, and actual azimuth and tilt data for the first antenna, and a first technician tool for communicating the actual position data for the first antenna to the second end-point alignment kit. The second end-point alignment kit may include a second antenna alignment device for determining the actual position data, and actual azimuth and tilt data for the second antenna, and a second technician tool. The second technician tool may receive the actual position data for the first antenna, determine respective target azimuth and tilt data for the second antenna based upon the actual position data of the first antenna, and display the actual azimuth and tilt data for the second antenna.

12 Claims, 15 Drawing Sheets

(51) Int. Cl.
*G01S 19/35* (2010.01)
*H01Q 3/14* (2006.01)
*H01Q 3/32* (2006.01)
*H01Q 3/34* (2006.01)
*G01S 19/14* (2010.01)
*G01S 19/51* (2010.01)
*H01Q 1/12* (2006.01)
*H04W 4/02* (2018.01)
*H04L 29/08* (2006.01)

(52) U.S. Cl.
CPC .............. *G01S 19/51* (2013.01); *H01Q 1/125* (2013.01); *H01Q 3/32* (2013.01); *H01Q 3/34* (2013.01); *H04L 67/10* (2013.01); *H04W 4/025* (2013.01)

(58) Field of Classification Search
USPC .................................................. 342/359, 372
See application file for complete search history.

(56) References Cited

U.S. PATENT DOCUMENTS

| | | | |
|---|---|---|---|
| 2003/0224801 A1* | 12/2003 | Lovberg | H01Q 1/125 455/454 |
| 2006/0178142 A1 | 8/2006 | Lovberg | |
| 2008/0088518 A1* | 4/2008 | Charash | H01Q 1/1257 343/757 |
| 2009/0021447 A1 | 1/2009 | Austin et al. | |
| 2009/0243930 A1* | 10/2009 | Tien | H01Q 1/1257 342/360 |
| 2013/0135146 A1* | 5/2013 | Ransom | G01S 19/23 342/357.36 |
| 2016/0056523 A1 | 2/2016 | Olsson et al. | |
| 2016/0056525 A1* | 2/2016 | Hansryd | H01Q 1/1257 342/359 |
| 2018/0062246 A1* | 3/2018 | Hershey | H01Q 1/1242 |

\* cited by examiner

ALIGNMENT SYSTEM FOR POINT-TO-POINT ALIGNMENT OF SPACED APART FIRST AND SECOND ANTENNAS AND RELATED METHODS

RELATED APPLICATIONS

The present application claims the priority benefit of provisional application Ser. No. 62/214,408 filed on Sep. 4, 2015, the entire contents of which are herein incorporated in their entirety by reference.

TECHNICAL FIELD

The present embodiments are directed to the field of antennas, and more particularly, to antenna alignment systems and related methods.

BACKGROUND

It may be desirable to have antennas aligned, not only for operation, but for increased communication efficiency. Present day alignment techniques may be relatively time consuming and involve picking visible landmarks somewhere between two end points or antennas. An educated guess or estimate is made on where the other end point would likely be relative to a given end point. Either or both antennas may be physically adjusted, for example, in azimuth and tilt, in an attempt to align the antennas. This may be particularly difficult as microwave links, for example, can have a length in the 40 mile range, which is beyond a human's visible sight range.

This present day guess and check method involves an increased amount of time for a technician to be on top of a tower moving the antenna back and forth in an attempt to find the other end point.

U.S. Patent Application Publication No. 2016/0056525 to Hansryd et al. is directed to a radio antenna alignment tool. More particularly, Hansryd et al. discloses a sensor unit connected to a first directive antenna. The sensor unit determines a present direction of the first directive antenna. An interface on which sensor information that includes the present direction can be accessed. A guide device receives, on a first input port, the present direction of the first directive antenna from the interface of the sensor unit and indicates to a user at least one of the present direction of the first directive antenna, the location of the second antenna, and a preferred direction of the first directive antenna. The preferred direction of the first directive antenna is determined to maximize a signal quality metric for communication between the first directive antenna and at least one second antenna.

SUMMARY

An alignment system for point-to-point alignment of spaced apart first and second antennas may include first and second end-point alignment kits. The first end-point alignment kit may include a first antenna alignment device to be temporarily mounted to the first antenna during alignment and configured to determine the actual position data, and actual azimuth and tilt data for the first antenna. The first end-point alignment kit may also include a first technician tool configured to communicate the actual position data for the first antenna to the second end-point alignment kit. The second end-point alignment kit may include a second antenna alignment device to be temporarily mounted to the second antenna during alignment and configured to determine the actual position data, and actual azimuth and tilt data for the second antenna, and a second technician tool. The second technician tool may be configured to receive the actual position data for the first antenna, determine respective target azimuth and tilt data for the second antenna based upon the actual position data of the first antenna, and display the actual azimuth and tilt data for the second antenna. Accordingly, the alignment system may provide increased efficiency point-to-point alignment, for example.

The second technician tool may be configured to communicate the actual position data of the second antenna to the first end-point alignment kit, for example. The first technician tool may be configured to receive the actual position data for the second antenna, determine respective target azimuth and tilt data for the first antenna based upon the actual position data of the second antenna, and display the actual azimuth and tilt data for the second antenna. The alignment system may also include a remote server that includes a processor and a memory coupled thereto and configured to store the actual azimuth and tilt data for the second antenna, for example.

The remote server may be configured to store the actual azimuth and tilt data for the first antenna, for example. The first technician tool may be configured to wirelessly communicate the actual position data to the second end-point alignment kit. The first antenna alignment device may be configured to wirelessly communicate the actual position data and the actual azimuth and tilt data to the first technician tool, for example.

The first antenna alignment device may include at least one geographical position determining device configured to determine the actual position data for the first antenna. The at least one geographical position determining device may include a plurality of geographical position determining devices, for example.

The second technician tool may be configured to graphically display the target azimuth and tilt data relative to the actual azimuth and tilt data, for example. The second technician tool may be configured to display the target azimuth and tilt data for the first antenna.

A method aspect is directed to a method of point-to-point alignment of spaced apart first and second antennas. The method may include using a first antenna alignment device of a first end-point alignment kit to determine the actual position data, and actual azimuth and tilt data for the first antenna. The first alignment device may be temporarily mounted to the first antenna during alignment. The method may also include using a first technician tool of the first end-point alignment device to communicate the actual position data for the first antenna to a second end-point alignment kit, and using a second antenna alignment device of the second end-point alignment kit to determine the actual position data, and actual azimuth and tilt data for the second antenna. The second antenna alignment device may be temporarily mounted to the second antenna during alignment. The method may also include using a second technician tool of the second end-point alignment kit to receive the actual position data for the first antenna, determine respective target azimuth and tilt data for the second antenna based upon the actual position data of the first antenna, and display the actual azimuth and tilt data for the second antenna.

DETAILED DESCRIPTION

Figure 1:
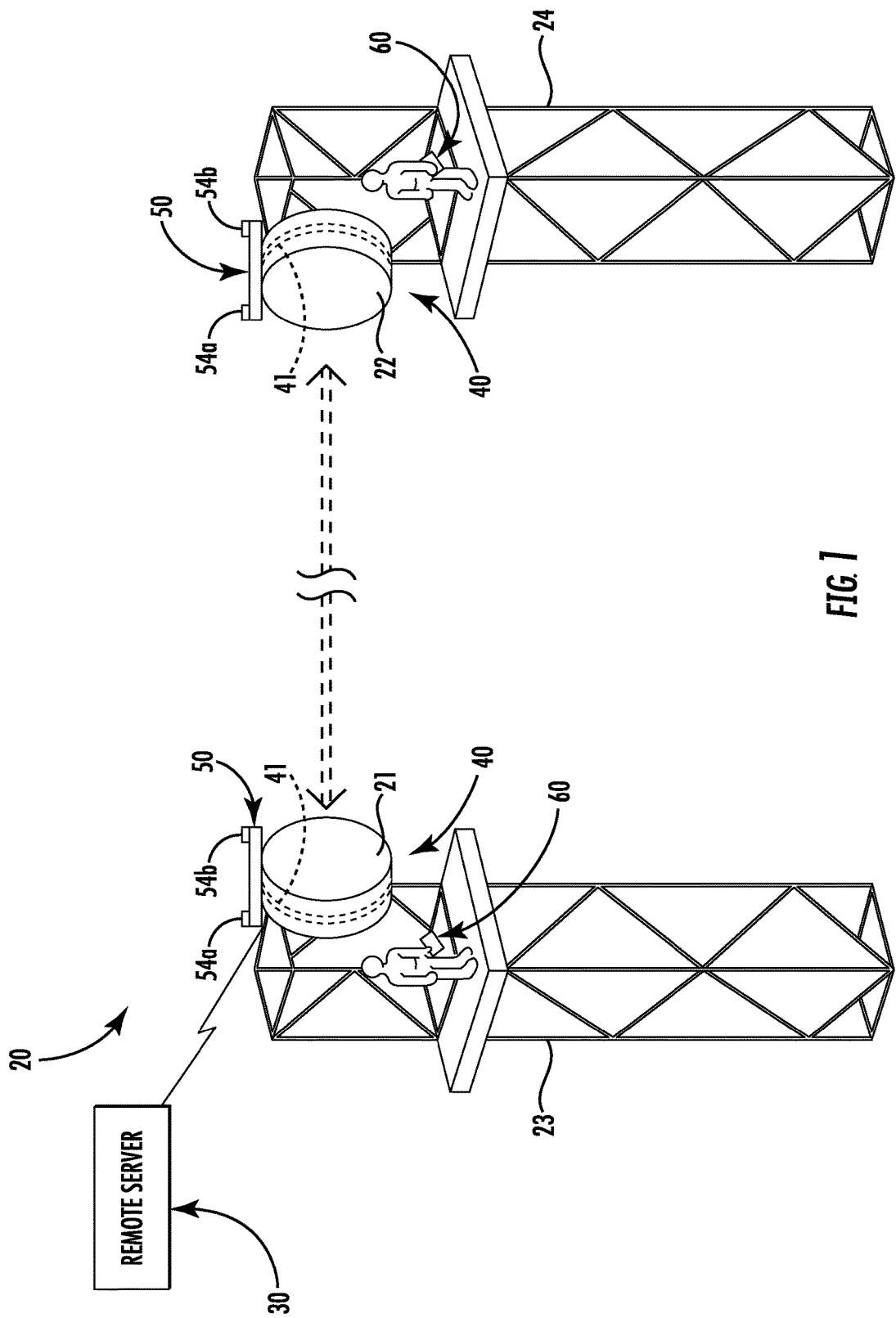
FIG. 1 is a schematic diagram of an alignment system in accordance with an embodiment.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime notation is used to indicate like elements in different embodiments.

Referring initially to FIGS. 1-4, an alignment system 20 for point-to-point alignment of spaced apart first and second antennas 21, 22 is illustrated. The first and second antennas 21, 22 are geographically spaced apart and carried by respective towers 23, 24, for example, and may be microwave antennas. The first and second antennas 21, 22 may define, for example, point microwave antenna links (e.g., backhaul data from one cellular tower to another). Of course, the first and second antennas 21, 22 may be other and/or different types of antennas and may define other and/or additional types of communication links (e.g. powered, unpowered, etc.).

The alignment system 20 includes a remote server 30 that includes a remote server processor 31 and a remote server memory 32 coupled thereto. The remote server memory 32 stores the actual position data of the given antenna for the given antenna 21, 22. The remote sever 30, and more particularly, the processor 31 determines respective target azimuth and tilt (i.e., elevation angle) data for each of the first and second spaced apart antennas 21, 22 based upon actual position data of the first and second spaced apart antennas.

The alignment system 20 also includes an end-point alignment kit 40. Each end-point alignment kit 40 includes a technician tool 60, and an antenna alignment device 50 to be temporarily mounted to a given antenna 21, 22 during alignment, for example. More particularly, each antenna alignment device 50 may be removably coupled to a respective antenna 21, 22 by way of a mount 41. The mount 41 may include an adjustable band or strap, for example, to secure the antenna alignment device 50 to the given antenna 21, 22. The mount 41 may also permit adjustment of the antenna alignment device 50 relative to the given antenna 21, 22, for example, in tilt, azimuth, orientation, etc. Of course the mount 41 may include other securing mechanisms, for example, elastic or rubber bands, ratcheting mechanisms, or clamping device, and may permit other and/or additional adjustments relative to the given antenna 21, 22. The antenna alignment system 20 may include more than one end-point alignment kit 40, as will be described in further detail below.

Figure 2:
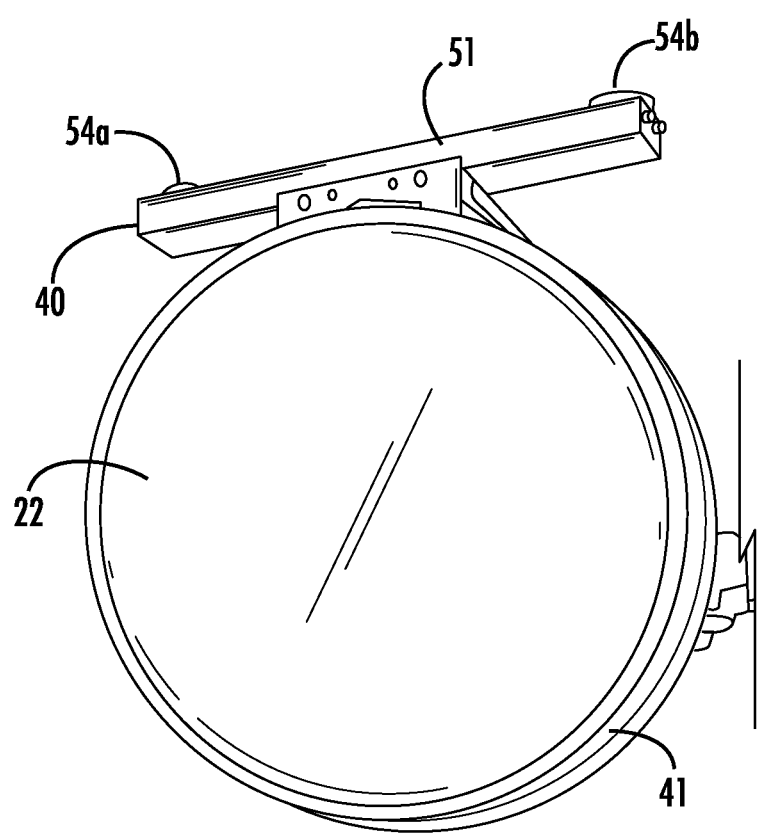
FIG. 2 is a diagram of an antenna alignment device of FIG. 1 mounted to an antenna.
Figure 3:
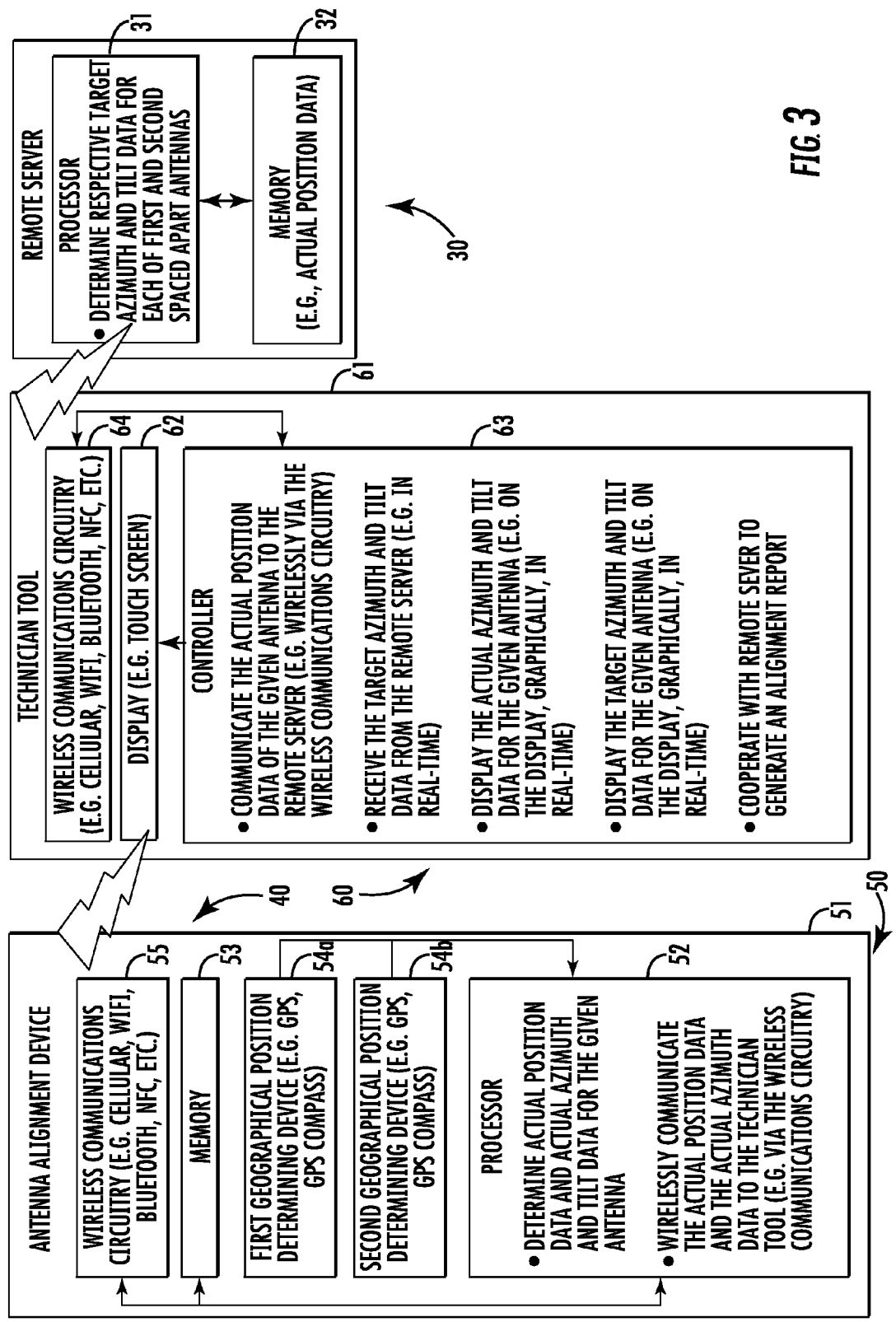
FIG. 3 is a schematic block diagram of the alignment system of FIG. 1.
Figure 4:
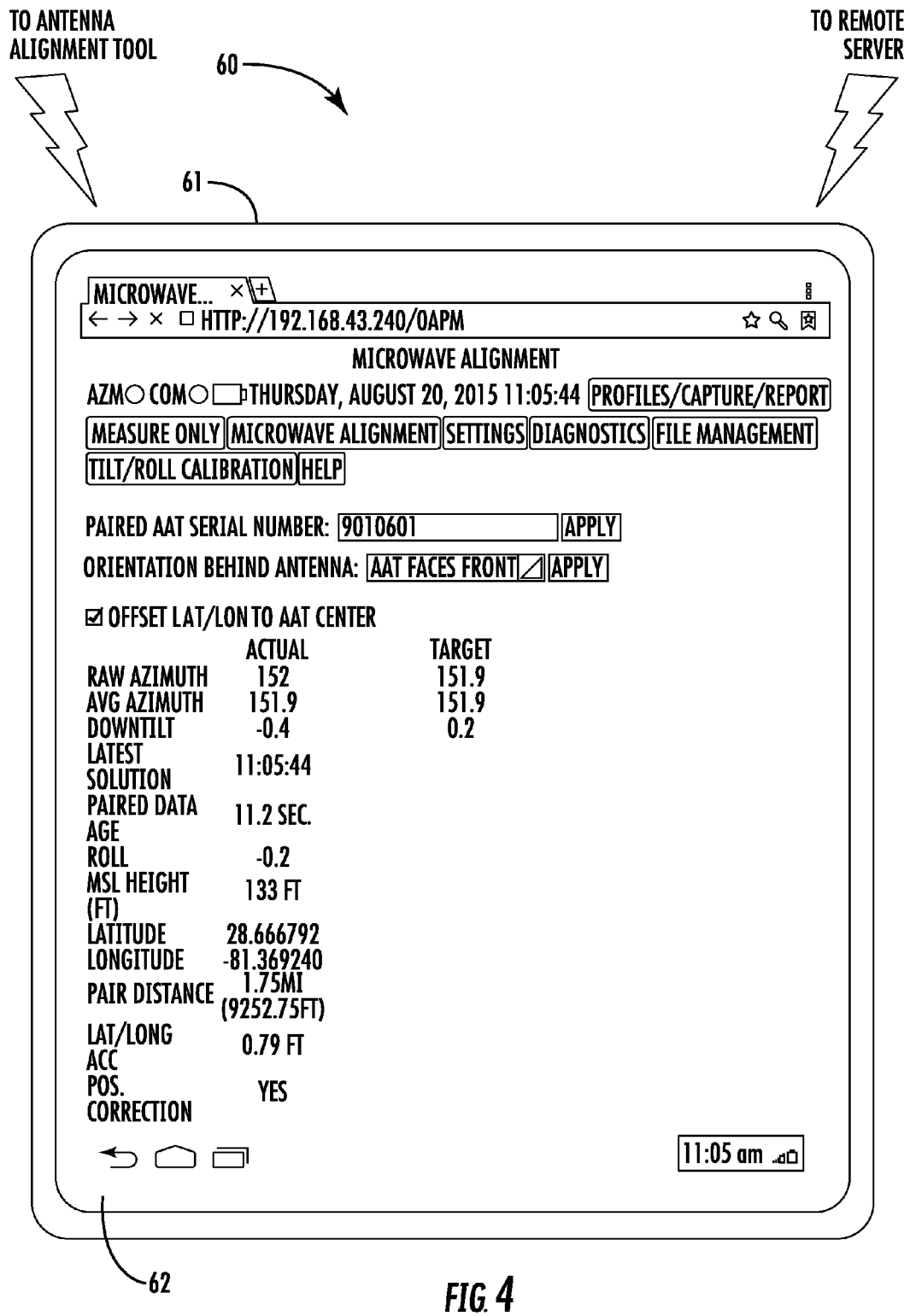
FIG. 4 is a diagram of a display of a technician tool of FIG. 1 during alignment.

The antenna alignment device 50 includes an alignment device housing 51 that illustratively has a generally elongate or rectangular shape (FIGS. 1 and 2). Of course, the alignment device housing 51 may be another shape. The antenna alignment device 50 also includes an alignment device processor 52 and an alignment device memory 53 carried by the device housing 51. The antenna alignment device 50 includes geographical position determining devices 54a, 54b carried by the device housing 51 at opposing ends thereof. The geographical position determining devices 54a, 54b may be global positioning system (GPS) receivers, for example, and cooperate with the alignment device processor 52 to determine actual position data for the given antenna 21, 22, for example, and may also cooperate to sense or measure azimuth (e.g. GPS-based compasses), tilt, roll and height (i.e. elevation, e.g. actual mean sea level (MSL) height), which, as will be appreciated by those skilled in the art, may all be highly desirable for increased accuracy alignment of the antennas. There may be any number of geographical position determining devices 54a, 54b (e.g., a single geographical position determining device) and the geographical position determining devices may be carried by the device housing at different locations. Moreover, while geographical position determining devices 54a, 54b are described, for example, as being GPS devices, it should be appreciated that other types of geographical position determining devices may be used, for example, a global navigation satellite system (GLONASS), or BeiDou navigation satellite system (BDS). Furthermore, it should be understood that the geographical position determining devices 54a, 54b may include physical antennas, receivers, either combined or multiple, and any associated circuitry, for example, RF front ends.

The antenna alignment device 50 also includes alignment device wireless communications circuitry 55 coupled to the processor 52. The alignment device wireless communications circuitry 55 may be cellular communication circuitry, for example. Alternatively or additionally, the alignment device wireless communications circuitry 55 may be WiFi, Bluetooth, near-field communication (NFC) or other relatively short range communications circuitry. The antenna alignment device 50 is advantageously battery powered (i.e., a battery is carried by the device housing 51), which may reduce hazards when positioned on one of the first and second antennas 21, 22. Of course, the antenna alignment device 50 may not be powered by a battery and may be powered alternatively or additionally from another power source. An example end-point alignment kit 40 is the AAT-15 available from Sunsight Instruments, LLC of Maitland, Fla.

The technician tool 60 is illustratively in the form of a ruggedized portable tablet computer and includes a portable housing 61 and a display 62 carried by the portable housing. Of course, the technician tool 60 may be in the form of another type of electronic device, for example, a laptop computer, a mobile phone, etc. The technician tool 60 may also be battery powered. Of course, the technician tool 60 may not be powered by a battery and may be powered alternatively or additionally from another power source. In some embodiments, the technician tool 60 may be carried by the antenna alignment device housing 51. In other words, the antenna alignment device housing 51 may carry the circuitry and/or display of the technician tool 60

The display 62 may be a touch screen display, for example. The technician tool 60 also includes a technician tool controller 63 coupled to the display 62. Technician tool wireless communications circuitry 64 is also carried by the portable housing 61 and coupled to the technician tool controller 63. The wireless communications circuitry 64 may be cellular, WiFi, Bluetooth, NFC, and/or another type of communications circuitry. The technician tool 60, in some embodiments, may include wired communications circuitry, for example, universal serial bus (USB), Ethernet, etc.

Figure 5:
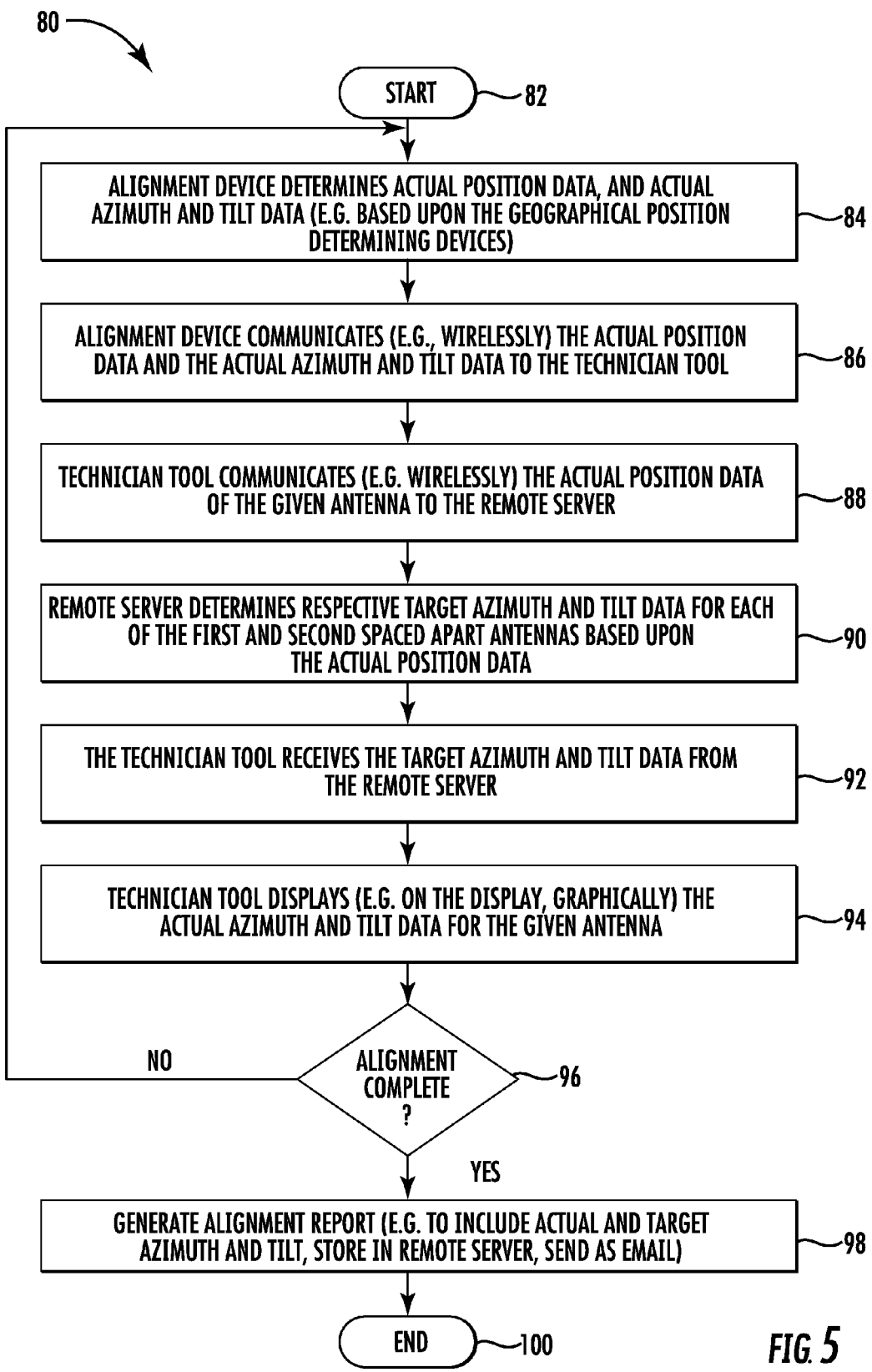
FIG. 5 is a flow chart illustrating operation of the alignment system of FIG. 1.

Referring now additionally to the flowchart 80 in FIG. 5, beginning at Block 82, operation of the antenna alignment system 20 will now be described. It should be understood by those skilled in the art that during operation of the antenna alignment system 20, "live" communication links between the first and second spaced apart antennas 21, 22 are not typically used. Of course, "live" communication links may be used. At Block 84, the alignment device processor 52 cooperates with the geographical position determining devices 54a, 54b to determine actual position data, and actual azimuth and tilt data for the given antenna 21, 22.

At Block 86, the alignment device processor 52 cooperates with the alignment device wireless communications circuitry 55 to wirelessly communicate the actual position data and the actual azimuth and tilt data to the technician tool 60 (e.g. via Bluetooth or WiFi), for example. In some embodiments, the actual position data and the actual azimuth and tilt data may be communicated through a wired interface to the technician tool 60. Upon receipt of the actual position data and the actual azimuth and tilt data from the antenna alignment device 50, e.g., via the technician tool wireless communications circuitry, the technician tool controller 63 cooperates with the technician tool wireless communications circuitry to wirelessly communicate the actual position data (e.g. via cellular or WiFi) for the given antenna 21, 22 to the remote server 30 (Block 88). Of course, the actual azimuth and tilt data may also be wirelessly communicated. In some embodiments, the actual position data and the actual azimuth and tilt data may be communicated to the remote server 30 via a wired interface. Moreover, in some embodiments, the actual position data may be communicated from the antenna alignment device 50.

The remote server 30, and more particularly, the remote server processor 31, upon receipt of the actual position data, determines respective target azimuth and tilt data for each of the first and second spaced apart antennas 21, 22 based upon actual position data of the first and second spaced apart antennas (Block 90). The actual position data and the actual azimuth and tilt data for either of the first and second spaced apart antenna 21, 22 may have been, prior to determining the respective target azimuth and tilt data, stored in the remote server memory 32, for example (i.e., a single end-point alignment kit is used by a single technician to provide actual position data, for example, in real-time; the actual position data from the second antenna may have be previously determined or may be determined in the future). Alternatively, the actual position data and the actual azimuth and tilt data for either or both of the first and second spaced apart antennas 21, 22 may be determined based upon real-time data being provided by a pair of end-point alignment kits 40 respectively at the first and second spaced apart antennas 21, 22 (i.e., two end-point alignment kits are being used by two technicians at the same time to provide actual position data, for example, in real-time).

The remote server 30, and more particularly, the remote server processor 31 sends the target azimuth and target tilt data to the technician tool 60. The technician tool 60, via the technician tool wireless communications circuitry 64, receives the target azimuth and tilt data from the remote server 30 (Block 92).

At Block 94, the technician tool 60 displays, on the display 62, the actual azimuth and tilt data for the given antenna 21, 22. More particularly, the technician tool 60 graphically displays the target azimuth and tilt data relative to the actual azimuth and tilt data, and/or relative to the Earth, for example, so that a tower technician can make azimuth and tilt adjustment to the given antenna 21, 22 for alignment. The display 62 may include a graphical representation (e.g., an indictor) and/or a numerical representation of the target azimuth and tilt data relative to the actual azimuth and tilt data. The display is updated, for example, in real-time, based upon the adjustments to an updated actual azimuth and tilt data. In other words, the communication process described above and the display of the target azimuth and tilt data relative to the actual azimuth and tilt data continues until a desired alignment. It will be appreciated by those skilled in the art that the antenna alignment system 20 may provide accuracy of ±0.4 degrees (R99) in azimuth and ±0.2 degrees in elevation angle.

Upon alignment or when desired (Block 96), for example, when the azimuth and tilt of the given antenna 21, 22 is within a threshold, the technician tool may be used to generate an alignment report. More particularly, the technician tool 60 may cooperate with the remote server 30 to generate and send (e.g., via email) an alignment report that includes the actual azimuth and tilt data and the target azimuth and tilt data (Block 98). Multiple reports may be merged into a single report, and/or the alignment report may include photographs or graphics, for example. The target azimuth and tilt data relative to the actual azimuth and tilt data are stored in the remote server memory 32, which may be used for generating and sending an alignment report, for example, at a later time. Problems that may occur as a result of improper data entry and/or incorrect path data sheets may also be reduced. In some embodiments, the technician tool 60 may generate a report without cooperation with the remote server 30.

The antenna alignment system 20 may further include an optional laser rangefinder that may be used to measure above ground level (AGL) height if desired. The method ends at Block 100.

As will be appreciated by those skilled in the art, typical present day alignment techniques involve picking visible landmarks somewhere between two end points and making an educated guess or estimate on where the other end would likely be, which may be particularly difficult as microwave links, for example, can be in the 40 mile range, which is beyond visible range. This present day guess and check method involves an increased amount of time on a tower moving the antenna back and forth in an attempt to find the other end of the link (both in azimuth and in tilt).

The above-described antenna alignment system 20 and method remove or significantly reduce the guess work and make the alignment a rote process. For example, the above-described antenna alignment system 20 and method may reduce an alignment process from about 4-16 hours to about 15 minutes, which results in increased labor savings. This may be a result of the wireless communications and the mounting arrangement of the antenna alignment device 50, as no break in any physical RF connections are necessary and neither waveguides, coaxial cables, and/or antenna mounted radios need to be removed from the tower. The antenna alignment system 20 also increases safety by limiting the amount of time technicians spend on the tower and makes a record of the alignment (the Federal Communications Commission (FCC) typically requires periodic alignment checking).

Figure 6:
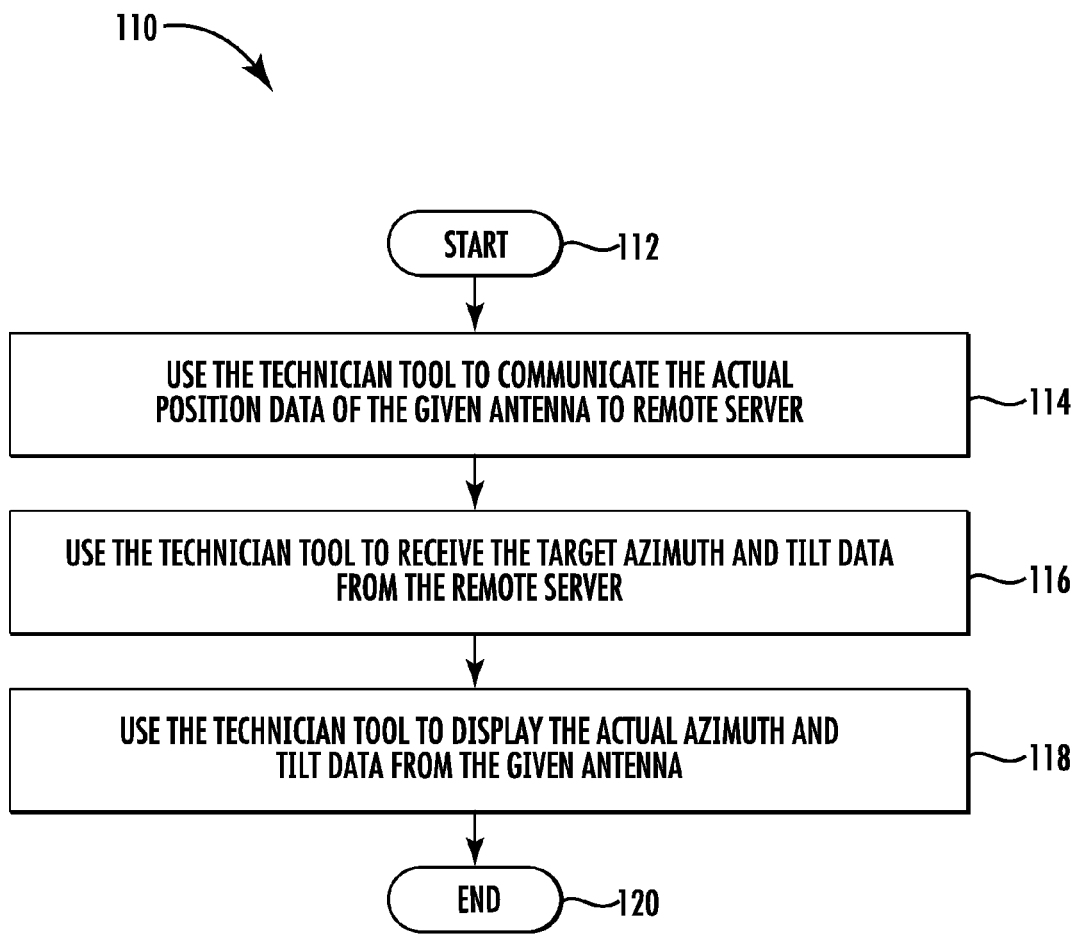
FIG. 6 is a flow chart illustrating a method of point to point alignment in accordance with an embodiment.
Figure 7:
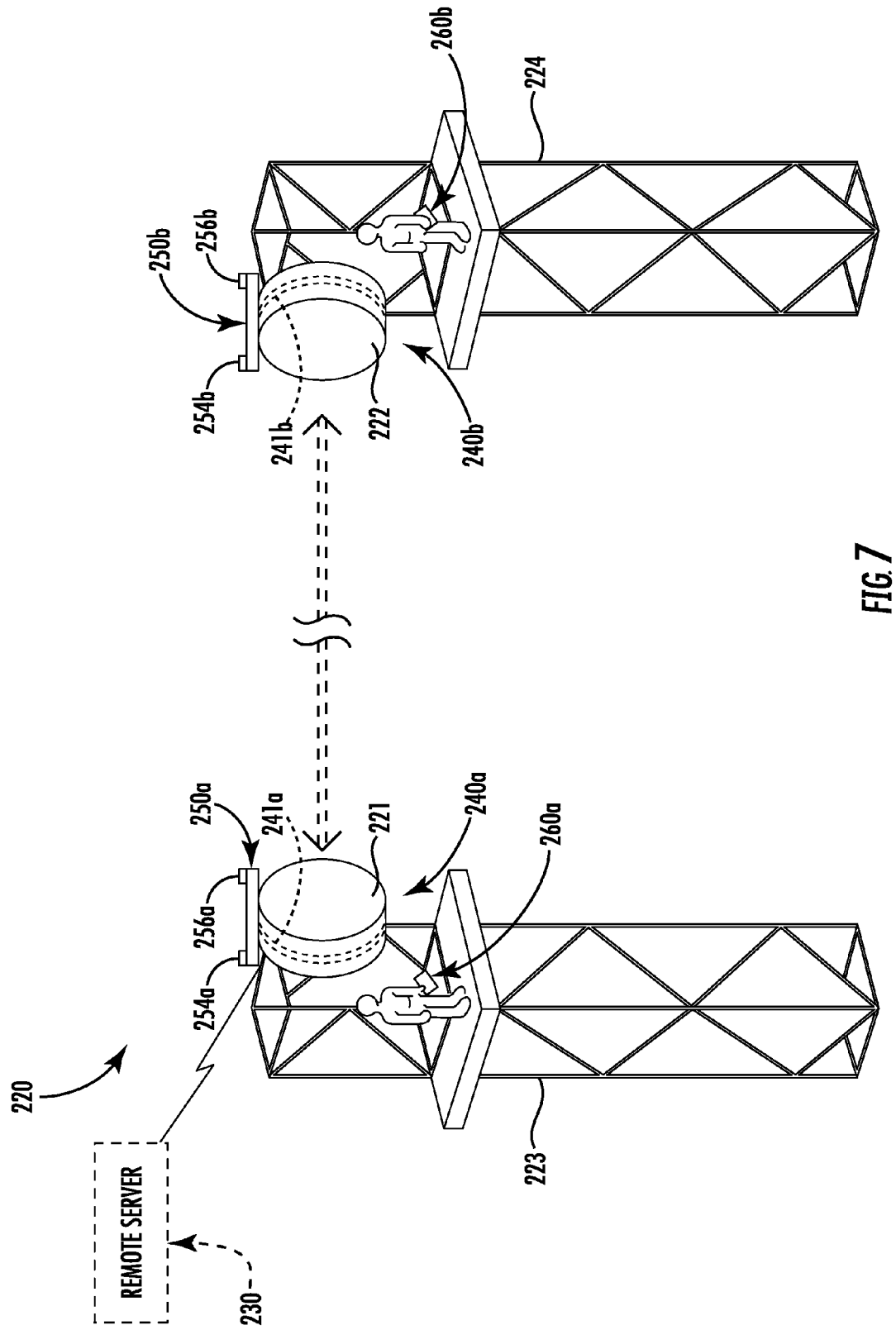
FIG. 7 is a schematic diagram of an alignment system in accordance with another embodiment.
Figure 8:
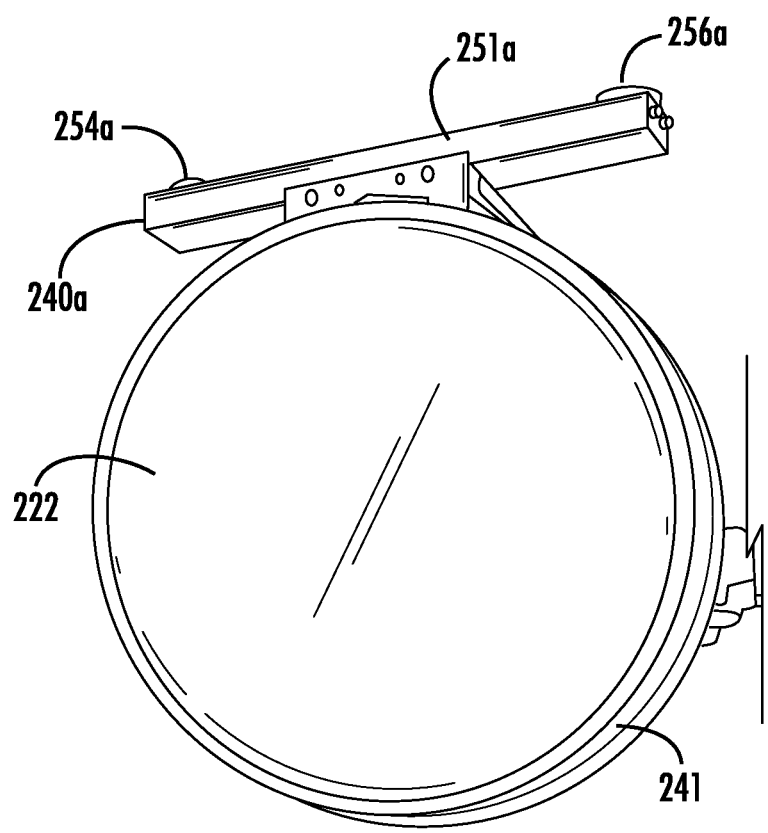
FIG. 8 is a diagram of an antenna alignment device of FIG. 7 mounted to an antenna.
Figure 9:
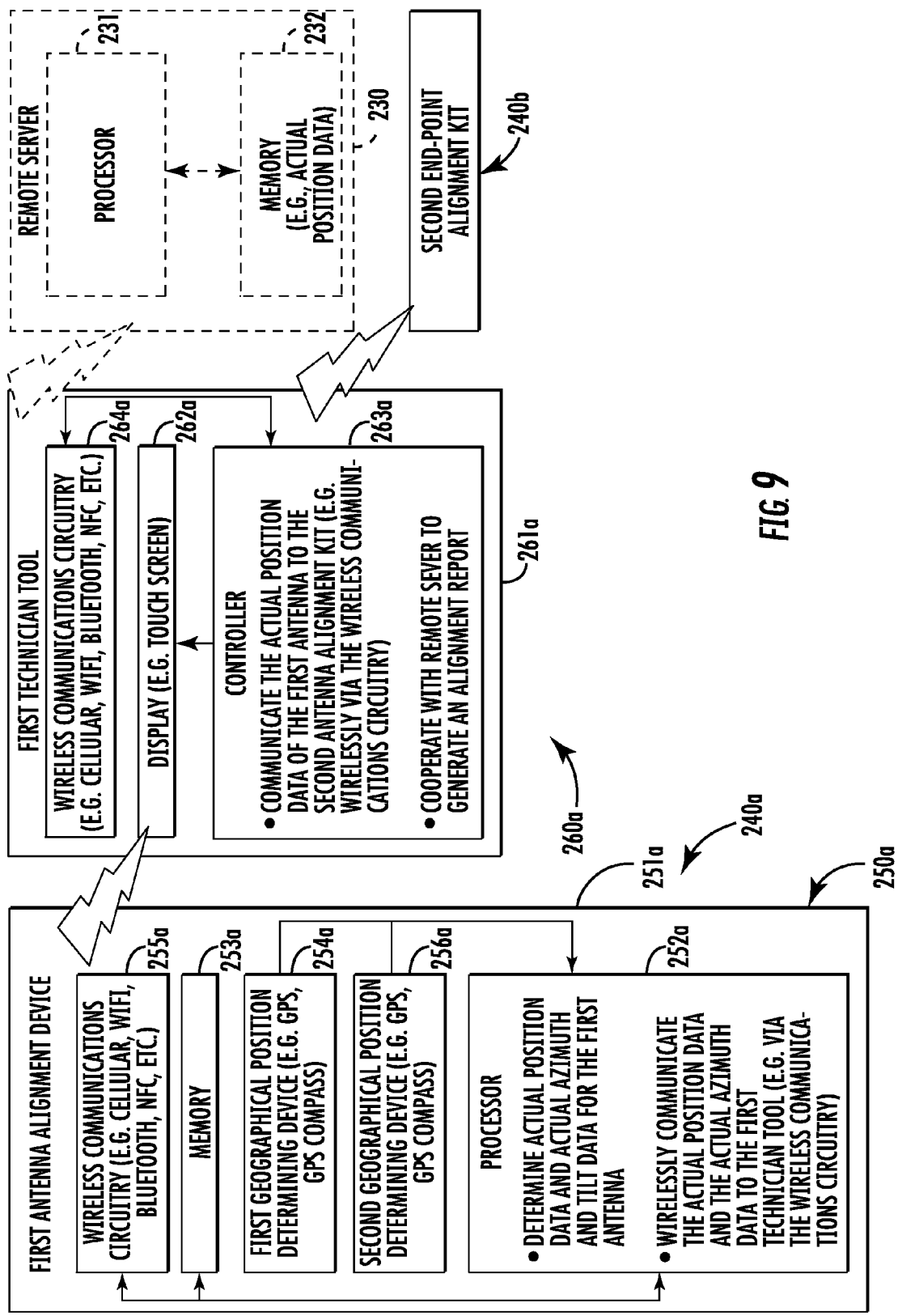
FIG. 9 is a schematic block diagram of a first end-point alignment kit in accordance with the embodiment of FIG. 7.
Figure 10:
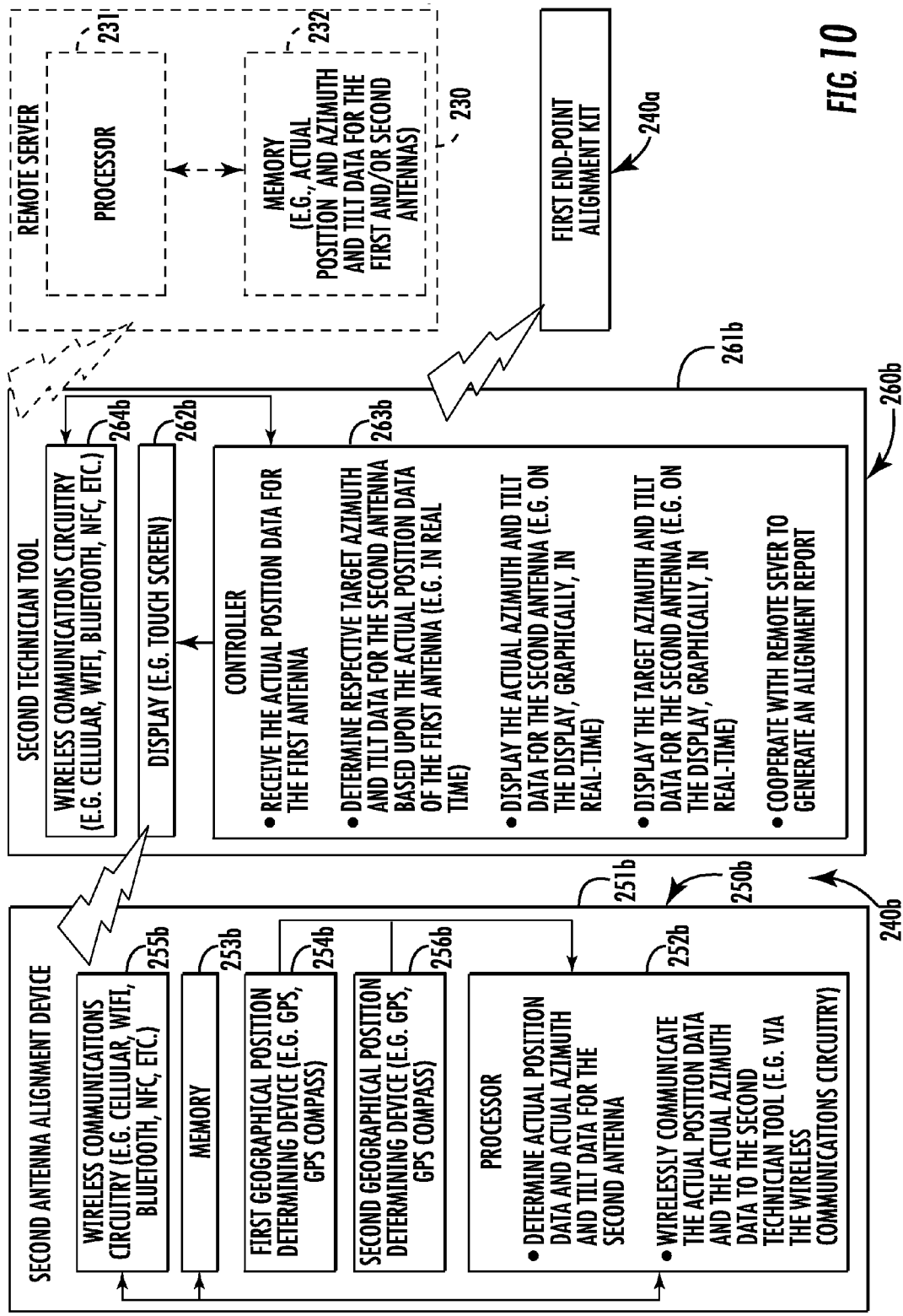
FIG. 10 is a schematic block diagram of a second end-point alignment kit in accordance with the embodiment of FIG. 7.
Figure 11:
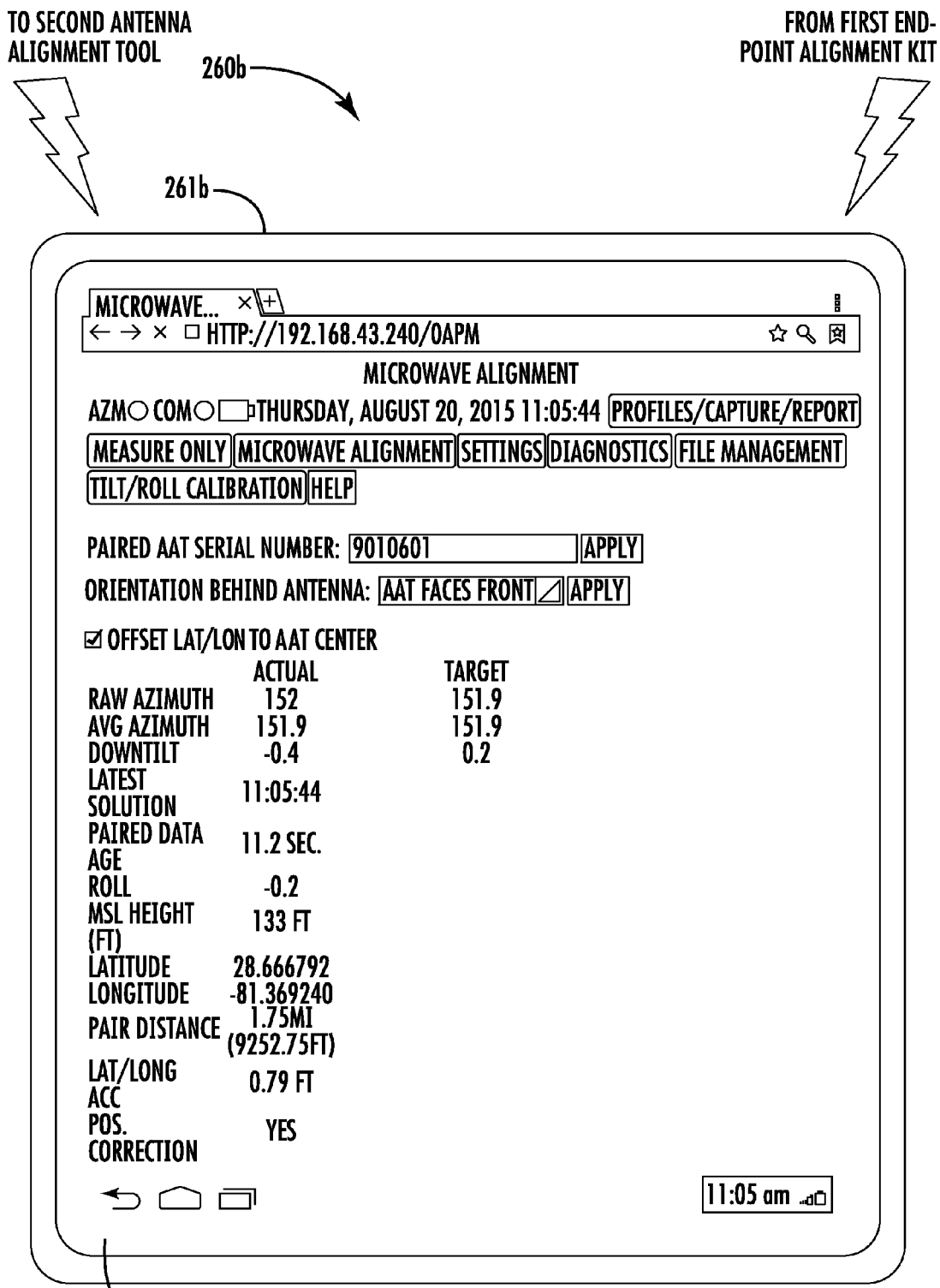
FIG. 11 is a diagram of a display of a technician tool of FIG. 7 during alignment.

Referring now to the flowchart 110 in FIG. 6, beginning at Block 112, a summary method includes, at Block 114, using the technician tool 60 to communicate the actual position data of the given antenna 21, 22 to the remote server 30. The method also includes using the technician tool 60 to receive the target azimuth and tilt data from the remote server 30 (Block 116) and using the technician tool to display the actual azimuth and tilt data from the given antenna 21, 22 (Block 118). The method ends at Block 120.

Referring now to FIGS. 7-11, in another embodiment, an alignment system 220 for point-to-point alignment of spaced apart first and second antennas 221, 222 carried by respective towers 223, 224, for example, includes first and second end-point alignment kits 240a, 240b. The first end-point alignment kit 240a includes a first antenna alignment device 250a to be temporarily mounted to the first antenna 221 during alignment, for example, by way of respective mounts 241a, 241b, as described above. The first antenna alignment device 250a may be secured to the first antenna 221 by any of the techniques described above, for example.

The first antenna alignment device 250a includes first alignment device housing 251a that illustratively has a generally elongate or rectangular shape, similar to the embodiments described above with respect to FIGS. 1 and 2. Of course, the first alignment device housing 251a may be another shape. The first antenna alignment device 250a also includes a first alignment device processor 252a and a first alignment device memory 253a carried by the first alignment device housing 251a. The first antenna alignment device 250a also includes first geographical position determining devices 254a, 256a carried by the first alignment device housing 251a at opposing ends thereof. The first geographical position determining devices 254a, 256a may be global positioning system (GPS) receivers, for example, or other type of geographical positioning system, as described above. The first geographical position determining devices 254a, 256a cooperate with the first alignment device processor 252a to determine actual position data for the first antenna 221, for example, and may also cooperate to sense or measure azimuth (e.g. GPS-based compasses), tilt, roll, and height, which, as will be appreciated by those skilled in the art, may all be highly desirable for increased accuracy alignment of the antennas. There may be any number of first geographical position determining devices 254a, 256a (e.g., a single geographical position determining device) and the geographical position determining devices may be carried by the first alignment device housing 251a at different locations.

The first antenna alignment device 250a also includes first alignment device wireless communications circuitry 255a coupled to the first alignment device processor 252a. The first alignment device wireless communications circuitry 255a may be cellular communication circuitry, for example. Alternatively or additionally, the first alignment device wireless communications circuitry 255a may be WiFi, Bluetooth, near-field communication (NFC) or other relatively short range communications circuitry. The first antenna alignment device 250a may be advantageously battery powered, for example, as described above.

The first antenna alignment system 220a also includes a first technician tool 260a. The first technician tool 260a, similarly to the embodiments described above, illustratively in the form of a ruggedized portable tablet computer and includes a first portable housing 261a and a first display 262a carried by the first portable housing. Of course, the first technician tool 260a may be in the form of another type of electronic device, for example, a laptop computer, a mobile phone, etc. The first technician tool 260a may also be battery powered. Of course, the first technician tool 260a may not be powered by a battery and may be powered alternatively or additionally from another power source.

The first display 262a may be a touch screen display, for example. The first technician tool 260a also includes a first technician tool controller 263a coupled to the first display 262a. First technician tool wireless communications circuitry 264a is also carried by the first portable housing 261a and coupled to the first technician tool controller 263a. The first wireless communications circuitry 264a may be cellular, WiFi, Bluetooth, NFC, and/or another type of communications circuitry. The first technician tool controller 263a cooperates with the first technician tool wireless communications circuitry 264a to communicate the actual position data of the first antenna 221 to the second end-point alignment kit 240b. The first technician tool 260a may be carried by the first antenna alignment device housing 251a. In other words, the first antenna alignment device housing 251a may carry the circuitry and/or display of the first technician tool 260a.

The second end-point alignment kit 240b includes a second antenna alignment device 250b to be temporarily mounted to the second antenna 222 during alignment. The second antenna alignment device 250b may be secured to the second antenna 222 by any of the techniques described above, for example.

The second antenna alignment device 250b includes second alignment device housing 251b that illustratively has a generally elongate or rectangular shape, similar to the embodiments described above with respect to FIGS. 1 and 2. Of course, the second alignment device housing 251b may be another shape. The second antenna alignment device 250b also includes a second alignment device processor 252b and a second alignment device memory 253b carried by the second alignment device housing 251b.

The second antenna alignment device 250b also includes second geographical position determining devices 254b, 256b carried by the second alignment device housing 251b at opposing ends thereof. The second geographical position determining devices 254b, 256b may be global positioning system (GPS) receivers, for example, or other type of geographical positioning system, as described above. The second geographical position determining devices 254b, 256b cooperate with the second alignment device processor 252b to determine actual position data for the second antenna 222, for example, and may also cooperate to sense or measure azimuth (e.g. GPS-based compasses), tilt, roll, and height, which, as will be appreciated by those skilled in the art, may all be highly desirable for increased accuracy alignment of the antennas. There may be any number of second geographical position determining devices 254b, 256b (e.g., a single geographical position determining device) and the geographical position determining devices may be carried by the second alignment device housing 251b at different locations.

The second antenna alignment device 250b also includes second alignment device wireless communications circuitry 255b coupled to the second alignment device processor 252b. The second alignment device wireless communications circuitry 255b may be cellular communication circuitry, for example. Alternatively or additionally, the second alignment device wireless communications circuitry 255b may be WiFi, Bluetooth, near-field communication (NFC) or other relatively short range communications circuitry. The second alignment device wireless communications circuitry 255b cooperates to communicate the actual position data and actual azimuth and tilt data for the second antenna to a second technician tool 260b of the second antenna alignment system 220b.

The second technician tool 260b, similarly to the embodiments described above, is illustratively in the form of a ruggedized portable tablet computer and includes a portable housing 261b and a display 262b carried by the portable housing. Of course, the second technician tool 260b may be in the form of another type of electronic device, for example, a laptop computer, a mobile phone, etc. The second technician tool 260b may also be battery powered. Of course, the second technician tool 260b may not be powered by a battery and may be powered alternatively or additionally from another power source.

The display 262b may be a touch screen display, for example. The second technician tool 260b also includes a second technician tool controller 263b coupled to the display 262b. Second technician tool wireless communications circuitry 264b is also carried by the portable housing 261b and coupled to the second technician tool controller 263b. The second technician tool wireless communications circuitry 264b may be cellular, WiFi, and/or another type of communications circuitry.

The second technician tool controller 263b cooperates with the second technician tool wireless communications circuitry 264b to wirelessly receive the actual position data and actual azimuth and tilt data for the first antenna 221. The second technician tool controller 263b determines respective target azimuth and tilt data for the second antenna 222 based upon the actual position data of the first antenna 221. The second technician tool controller 263b displays, via the display 262b, the actual azimuth and tilt data for the second antenna 222. Similar to that described above with respect to the first antenna alignment device and technician tool 250a, 260a, the second technician tool 260b may be carried by the second antenna alignment device housing 251b. In other words, the second antenna alignment device housing 251b may carry the circuitry and/or display of the second technician tool 260b.

It should be noted that, in some embodiments, a remote server 230, for example, may facilitate communications or relay communications between the first and second endpoint alignment kits 240a, 240b. The remote server 230, which is similar to that remote server described above with respect to the embodiments in FIGS. 1-4, may also store target and actual position and azimuth and tilt data for the first and second antennas 221, 222, but does not perform any calculations for determining the target azimuth and tilt data for the second antenna. The remote server 230 may also generate and send reports, for example, alignment reports, as described above.

Figure 12:
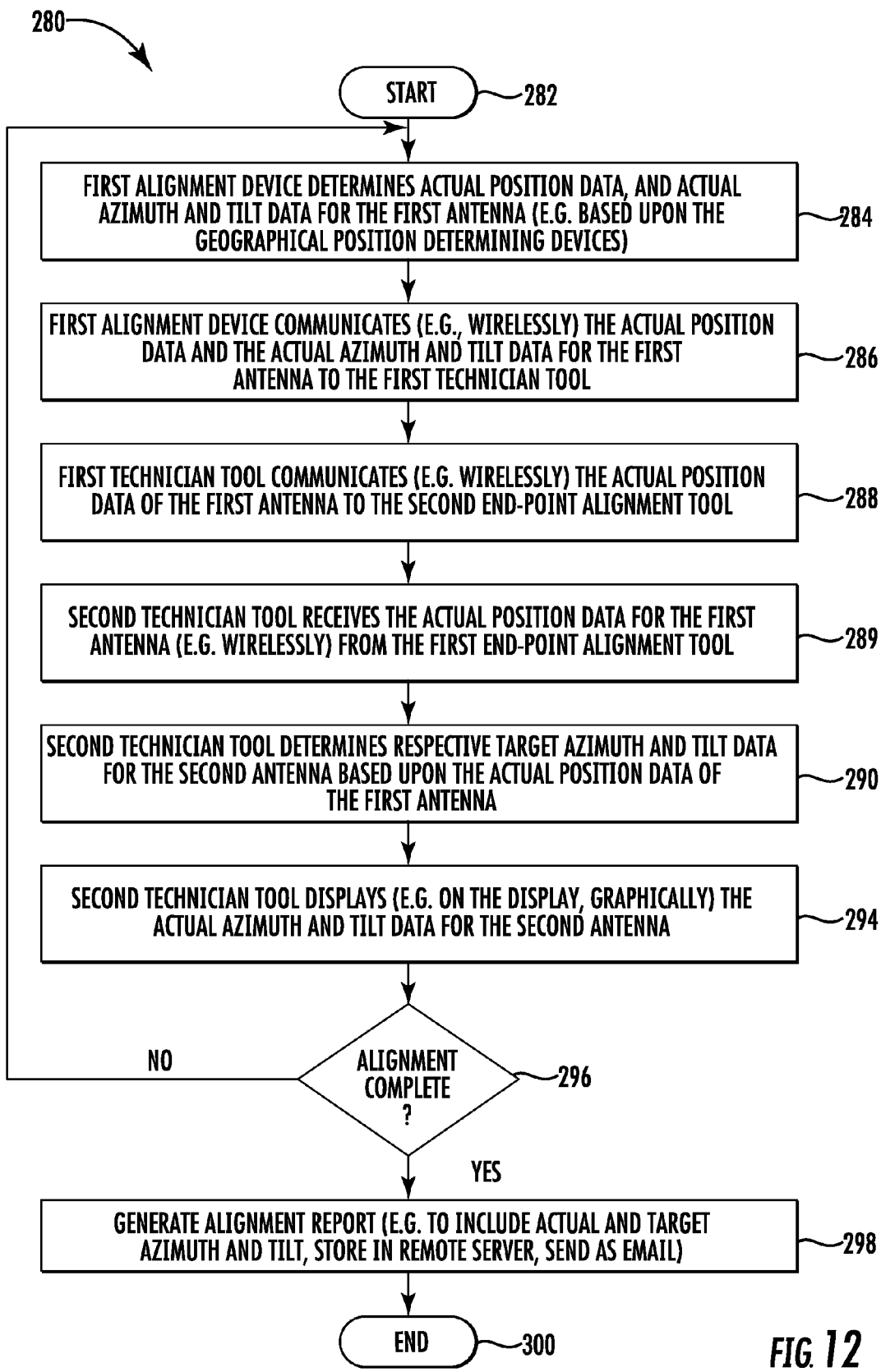
FIG. 12 is a flow chart illustrating operation of the alignment system of FIG. 7.

Referring now additionally to the flowchart 280 in FIG. 12, beginning at Block 282, operation of the antenna alignment system 220 will now be described. At Block 284, the first alignment device processor 252a cooperates with the geographical position determining devices 254a, 256a to determine actual position data, and actual azimuth and tilt data for the first antenna 221.

At Block 286, the first alignment device processor 252a cooperates with the alignment device wireless communications circuitry 255a to wirelessly communicate the actual position data and the actual azimuth and tilt data to the first technician tool 260a (e.g. via Bluetooth or WiFi), for example. In some embodiments, the actual position data and the actual azimuth and tilt data may be communicated through a wired interface to the technician tool 260a. Upon receipt of the actual position data and the actual azimuth and tilt data from the first antenna alignment device 250a, e.g., via the first technician tool wireless communications circuitry 264a, the first technician tool controller 263a cooperates with the technician tool wireless communications circuitry to wirelessly communicate the actual position data (e.g. via cellular or WiFi) of the first antenna 221 to the second end-point alignment kit 240b (Block 288). Of course, the actual azimuth and tilt data may also be wirelessly communicated. In some embodiments, the remote server 230, as described above, may be used to relay or facilitate communications between the first and second end-point alignment kits 240a, 240b (i.e., without performing any calculations thereon). Moreover, in some embodiments, the actual position data may be communicated from the antenna alignment devices 250a, 250b.

The second technician tool 260b, and more particularly, second technician tool controller 263b, cooperates with the second technician tool wireless communications circuitry 264b to receives the actual position data for the first antenna 221 (Block 289). The second technician tool controller 263b, upon receipt of the actual position data, determines respective target azimuth and tilt data for the second antenna 222 based upon actual position data of the first antenna 221 (Block 290). The receipt of the actual position data of the first antenna 221 and the determining of the target azimuth and tilt of the second antenna 222 may be performed in near real-time (i.e., two end-point alignment kits are being used by two technicians at the same time to provide actual position data, for example, in real-time).

At Block 294, the second technician tool 260b displays, on the display 262b, the actual azimuth and tilt data for the second antenna 222. More particularly, the second technician tool 260b graphically displays the target azimuth and tilt data, for example, relative to the actual azimuth and tilt data and/or relative to the Earth, so that a tower technician can make azimuth and tilt adjustment to the second antenna 222 for alignment. The display 262b may include a graphical representation (e.g., an indictor) and/or a numerical representation of the target azimuth and tilt data relative to the actual azimuth and tilt data and/or relative to the Earth, for example. The display 262b may be updated, for example, in real-time, based upon the adjustments to an updated actual azimuth and tilt data. In other words, the communication process described above and the display of the target azimuth and tilt data continues until a desired alignment.

Upon alignment or when desired (Block 296), for example, when the azimuth and tilt of the second antenna 222 is within a threshold, the second technician tool 260b may be used to generate an alignment report. More particularly, the second technician tool 260b may cooperate with a remote server 230 to generate and send (e.g., via email) an alignment report that includes the actual azimuth and tilt data and the target azimuth and tilt data of the second antenna 222 (Block 298). Multiple reports may be merged into a single report, and/or the alignment report may include photographs or graphics, for example. The target azimuth and tilt data, for example, relative to the actual azimuth and tilt data for the second antenna 222 are stored in the remote server memory 232 that is coupled to a remote server processor 231 and which may be used for generating and sending an alignment report, for example, at a later time. The actual azimuth and tilt data, and position data, may also be stored in the memory 232 of the remote server 230. Problems that may occur as a result of improper data entry and/or incorrect path data sheets may also be reduced. The method ends at Block 300.

Figure 13:
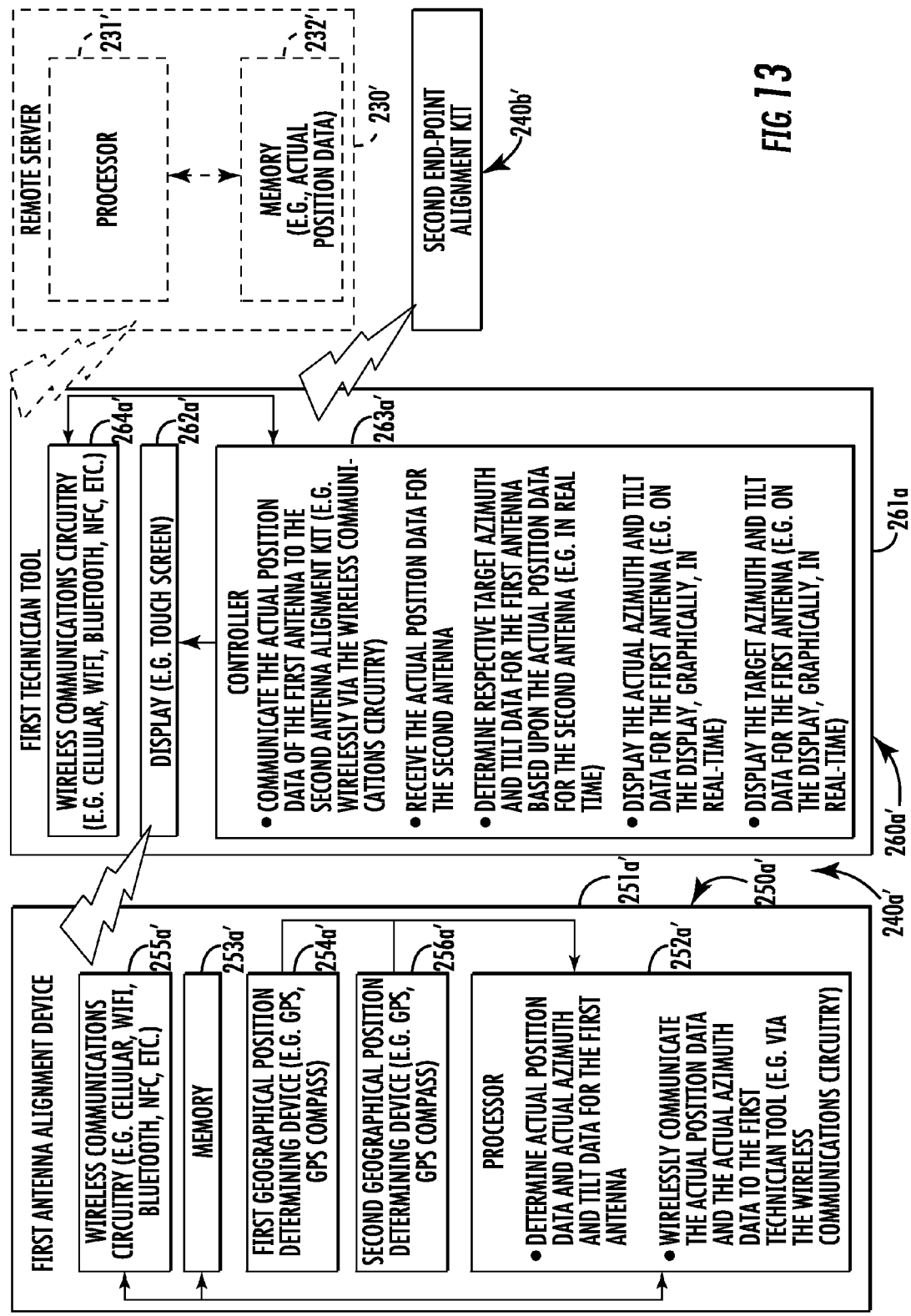
FIG. 13 is a schematic block diagram of a first end-point alignment kit of another embodiment of alignment system.
Figure 14:
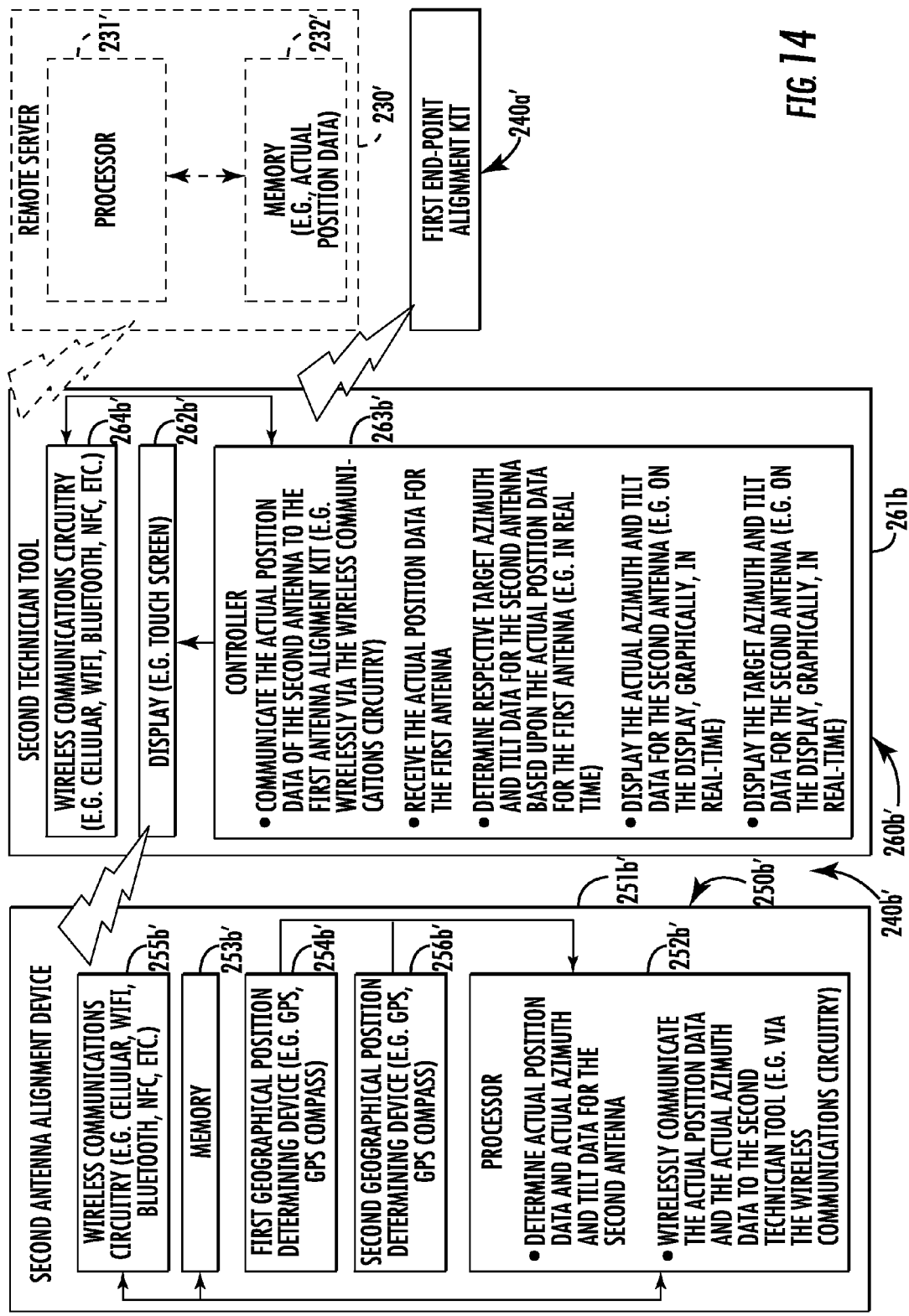
FIG. 14 is a schematic block diagram of a second end-point alignment kit for use with the first end-point alignment kit in FIG. 13.

Referring now to FIGS. 13-14, in another embodiment, the second technician tool 260b' communicates the actual position data of the second antenna 222' to the first end-point alignment kit 240a'. The first technician tool 260a' receives the actual position data for the second antenna 222' and determines the respective target azimuth and tilt data for the first antenna 221' based upon the actual position data of the second antenna 222'. The first technician tool 260a' also displays the actual azimuth and tilt data for the second antenna 222'. In other words, the alignment system 220' is bi-directional in that each of the first and second end-point alignment units 240a', 240b' includes both the functionality of the first and second end-point alignment units described in the above embodiments (i.e., the first and second end-point alignment units are functionally equivalent with respect to the given first or second antenna 221', 222').

Figure 15:
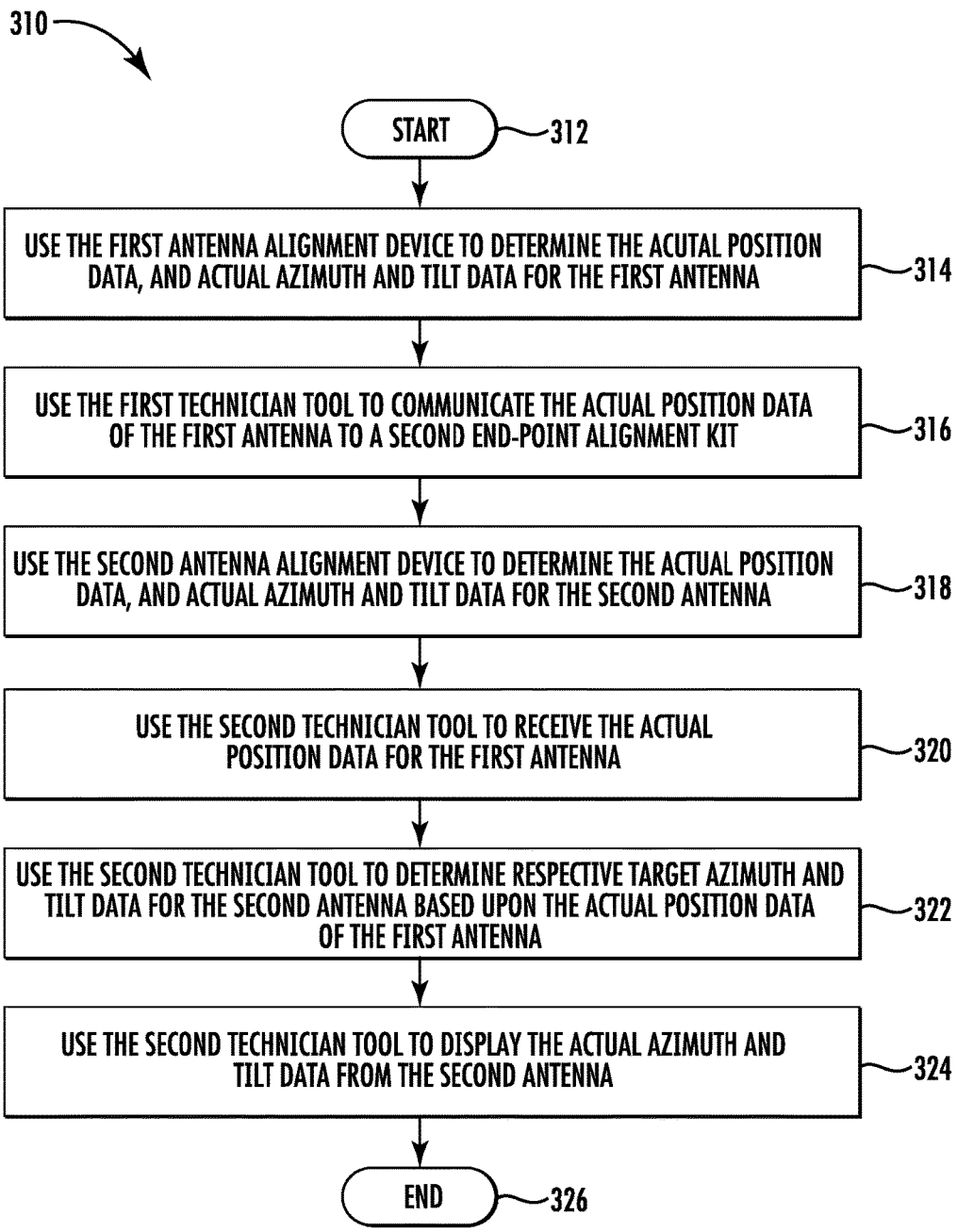
FIG. 15 is a flow chart illustrating a method of point to point alignment in accordance with an embodiment.

Referring now to the flowchart 310 in FIG. 15, beginning at Block 312, a summary method of point-to-point alignment includes, at Block 314, using the first antenna alignment device 250a of the first end-point alignment kit 240a to determine the actual position data, and actual azimuth and tilt data for the first antenna 221. The method also includes using the first technician tool 260a of the first end-point alignment kit 240a to communicate the actual position data of the first antenna to a second end-point alignment kit 240b (Block 316). The method also includes using the second antenna alignment device 250b of the second end-point alignment kit 240b to determine the actual position data, and actual azimuth and tilt data for the second antenna 222 (Block 318). The method includes using the second technician tool 260b of the second end-point alignment kit 240b to receive the actual position data for the first antenna 221 (Block 320), determine respective target azimuth and tilt data for the second antenna 222 based upon the actual position data of the first antenna (Block 322), and display the actual azimuth and tilt data for the second antenna (Block 324). The method ends at Block 326.

In some embodiments, any of the first and second end-point alignment kits 240a, 240b associated with a given antenna 221, 222 may communicate with the remote server 230 or have loaded therein (e.g. prior to) the actual position data and actual target and azimuth data for the other antenna. The first or second end-point alignment kit 240a, 240b may then, based upon the actual position data, determine the respective target azimuth and tilt data for the other antenna 221, 222 and display the azimuth and tilt data for the given antenna.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An alignment system for point-to-point alignment of spaced apart first and second antennas, the alignment system comprising:
   first and second end-point alignment kits;
   said first end-point alignment kit comprising
      a first antenna alignment device to be temporarily mounted to the first antenna during alignment and comprising
         a first alignment device housing,
         first alignment device wireless communications circuitry carried by said first alignment device housing, and
         a first alignment device processor coupled to said first alignment device wireless communications circuitry and configured to determine the actual position data, and actual azimuth and tilt data for the first antenna, and
      a first technician tool remote from said first end-point alignment kit and comprising
         a first housing,
         first wireless communications circuitry carried by said first housing, and
         a first technician tool controller coupled to said first wireless communications circuitry, and configured to
            cooperate with said first alignment device wireless communications circuitry to obtain the actual position data for the first antenna, and
            wirelessly communicate, via said first wireless communications circuitry, the actual position data for the first antenna to said second end-point alignment kit;
   said second end-point alignment kit comprising
      a second antenna alignment device to be temporarily mounted to the second antenna during alignment and configured to determine the actual position data, and actual azimuth and tilt data for the second antenna, and
      a second technician tool comprising
         a second housing,
         a second display carried by said second housing,
         second wireless communications circuitry carried by said second housing, and
         a second technician tool controller coupled to said second display and said second wireless communications circuitry, and configured to
            wirelessly receive, via said second wireless communications circuitry, the actual position data for the first antenna from said first technician tool,
            determine respective target azimuth and tilt data for the second antenna based upon the actual position data of the first antenna, and
            display the actual azimuth and tilt data for the second antenna on said second display.

2. The alignment system of claim 1 wherein said second technician tool is configured to communicate the actual position data for the second antenna to said first end-point alignment kit; and wherein said first technician tool is configured to receive the actual position data for the second antenna, determine respective target azimuth and tilt data for the first antenna based upon the actual position data of the second antenna, and display the actual azimuth and tilt data for the second antenna.

3. The alignment system of claim 2 further comprising a remote server and comprising a processor and a memory coupled thereto and configured to store the actual azimuth and tilt data for the second antenna.

4. The alignment system of claim 1 further comprising a remote server and comprising a processor and a memory coupled thereto and configured to store the actual azimuth and tilt data for the first antenna.

5. The alignment system of claim 1 wherein said first antenna alignment device comprises at least one geographical position determining device configured to determine the actual position data for the first antenna.

6. The alignment system of claim 5 wherein said at least one geographical position determining device comprises a plurality of geographical position determining devices.

7. The alignment system of claim 1 wherein said second technician tool is configured to graphically display the target azimuth and tilt data relative to the actual azimuth and tilt data.

8. The alignment system of claim 1 wherein said second technician tool is configured to display the target azimuth and tilt data for the first antenna.

9. A method of point-to-point alignment of spaced apart first and second antennas, the method comprising:
   using a first alignment device processor of a first antenna alignment device of a first end-point alignment kit to determine the actual position data, and actual azimuth and tilt data for the first antenna, the first antenna alignment device being temporarily mounted to the first antenna during alignment, and comprising a first alignment device housing, and first alignment device wireless communications circuitry carried by the first alignment device housing and coupled to the first alignment device processor;
   using a first technician tool controller of a first technician tool of the first end-point alignment device, the first technician tool being remote from the first end-point alignment kit and comprising a first housing and first wireless communications circuitry carried by the first housing and coupled to the first technician tool controller, the first technician tool controller being used to
      cooperate with the first alignment device wireless communications circuitry to obtain the actual position data for the first antenna, and
      wirelessly communicate, via the first wireless communications circuitry, the actual position data for the first antenna to the second end-point alignment kit;
   using a second antenna alignment device of the second end-point alignment kit to determine the actual position data, and actual azimuth and tilt data for the second antenna, the second antenna alignment device being temporarily mounted to the second antenna during alignment; and
   using a second technician tool controller of a second technician tool of the second end-point alignment kit, the second technician tool comprising a second housing, a second display carried by the second housing and coupled to the second technician tool controller, and second wireless communications circuitry carried by the second housing and coupled to the second technician tool controller, the second technician tool controller being used to
      wirelessly receive, via the second wireless communications circuitry, the actual position data for the first antenna from the first technician tool,
      determine respective target azimuth and tilt data for the second antenna based upon the actual position data of the first antenna, and
      display the actual azimuth and tilt data for the second antenna on the second display.

10. The method of claim 9 wherein the second technician tool is used to communicate the actual position data for the second antenna to the first end-point alignment kit; and wherein the first technician tool is used to receive the actual position data for the second antenna, determine respective target azimuth and tilt data for the first antenna based upon the actual position data of the second antenna, and display the actual azimuth and tilt data for the second antenna.

11. The method of claim 9 wherein the first technician tool wirelessly communicates the actual position data to the second end-point alignment kit.

12. The method of claim 9 wherein the actual position data for the first antenna is determined based upon at least one geographical position determining device.

* * * * *